US008436934B2

(12) United States Patent
Chou et al.

(10) Patent No.: US 8,436,934 B2
(45) Date of Patent: *May 7, 2013

(54) METHOD FOR USING FLASH TO ASSIST IN FOCAL LENGTH DETECTION

(75) Inventors: Chan-Min Chou, Taipei County (TW); Chia-Lun Tsai, Changhua County (TW); Tsung-Pin Lu, Taipei County (TW); Tzu-Huang Huang, Changhua County (TW); Chih-Pin Yen, Taipei County (TW)

(73) Assignee: Altek Corporation, Hsinchu (TW)

( * ) Notice: Subject to any disclaimer, the term of this patent is extended or adjusted under 35 U.S.C. 154(b) by 406 days.

This patent is subject to a terminal disclaimer.

(21) Appl. No.: 12/784,727

(22) Filed: May 21, 2010

(65) Prior Publication Data

US 2011/0058095 A1    Mar. 10, 2011

(30) Foreign Application Priority Data

Sep. 9, 2009   (TW) .............................. 98130447 A

(51) Int. Cl.
*H04N 5/232*   (2006.01)
*H04N 5/222*   (2006.01)

(52) U.S. Cl.
USPC .......................................... 348/347; 348/371

(58) Field of Classification Search ............... 348/224.1, 348/371, 345, 349, 370
See application file for complete search history.

(56) References Cited

U.S. PATENT DOCUMENTS

| 7,711,253 | B2 * | 5/2010 | Tomita et al. ............... 396/53 |
| 7,777,805 | B2 * | 8/2010 | Ogami ...................... 348/364 |
| 8,199,247 | B2 * | 6/2012 | Chou et al. .................. 348/349 |
| 8,224,176 | B1 * | 7/2012 | Pillman et al. ............... 396/242 |
| 2002/0135688 | A1 * | 9/2002 | Niikawa ..................... 348/251 |
| 2004/0041919 | A1 * | 3/2004 | Yamanaka .................. 348/222.1 |
| 2006/0007346 | A1 * | 1/2006 | Nakamura et al. ............ 348/362 |
| 2006/0165399 | A1 * | 7/2006 | Feng et al. ................... 396/61 |
| 2006/0221212 | A1 * | 10/2006 | Hankawa et al. ........... 348/240.2 |
| 2006/0262659 | A1 * | 11/2006 | Kurosawa ....................... 369/1 |
| 2009/0244325 | A1 * | 10/2009 | Honjo et al. ................ 348/231.99 |

* cited by examiner

*Primary Examiner* — Aung S Moe
*Assistant Examiner* — Amy Hsu
(74) *Attorney, Agent, or Firm* — Morris Manning & Martin LLP; Tim Tingkang Xia, Esq.

(57) ABSTRACT

A method for assisting in focal length detection is applicable to a digital camera having the flash. The method includes the following steps. First, the flash of the digital camera is actuated and a first image is captured. Afterwards, a characteristic exposure value of the first image is calculated. A focus range comparison table is looked up according to the characteristic exposure value to obtain an initial focus position. Then, a focus procedure is performed according to the initial focus position to obtain a target focal length.

7 Claims, 10 Drawing Sheets

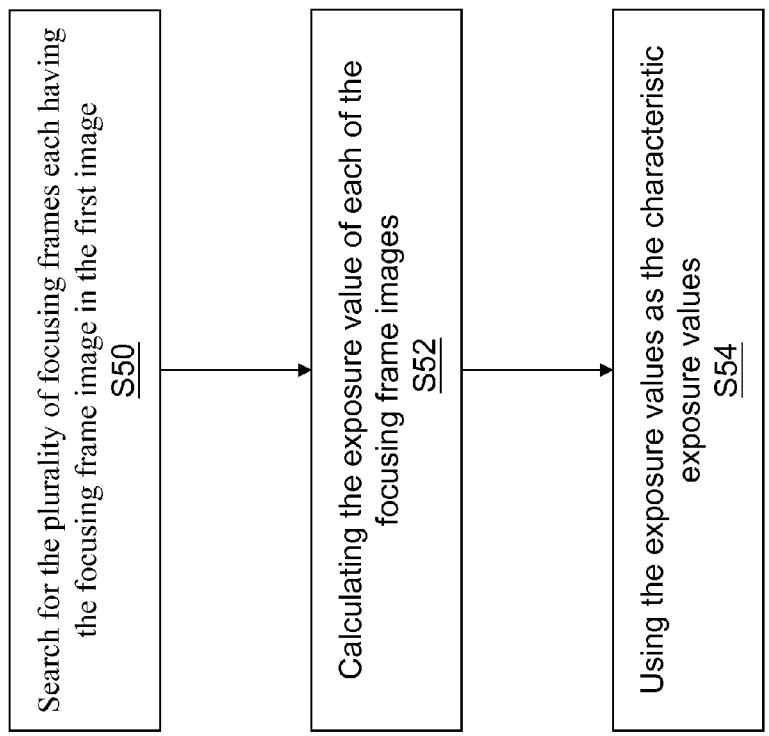

METHOD FOR USING FLASH TO ASSIST IN FOCAL LENGTH DETECTION

CROSS-REFERENCE TO RELATED APPLICATIONS

This non-provisional application claims priority under 35 U.S.C. §119(a) on Patent Application No(s). 098130447 filed in Taiwan, R.O.C. on Sep. 9, 2009, the entire contents of which are hereby incorporated by reference.

BACKGROUND OF THE INVENTION

1. Field of Invention

The present invention is related to a method for using a flash to assist in focal length detection, and more particularly to a method for looking up a characteristic exposure value table to assist in focal length detection.

2. Related Art

Nowadays, the auto focus of common digital cameras may substantially be divided into two types: one is active auto focus, and the other is passive auto focus.

In the active auto focus, a set of infrared transmitter or laser transmitter and corresponding receiver are used to project a pattern of light on an object to be photographed, and then a distance between the camera and the object to be photographed is calculated as a focal length through a method such as triangulation. Since the optical transmitter and receiver need to be additionally set in the camera when the active auto focus is used, the problem of high cost occurs.

In the passive auto focus, before the actual photographing, a camera lens of the digital camera is moved to a plurality of focus positions in the range from a focus position closest to the digital camera to infinity. The digital camera captures an image at the focus position and analyzes a definition to determine a focal length. The passive auto focus only needs to use an image sensor and an operation unit of the camera, and thus the manufacturing cost can be reduced.

However, since the passive auto focus has to rely on the definition calculated from the pre-captured image, when the object to be photographed is in an environment with insufficient brightness, the estimated focal length may have an error easily. In the photographing, if the environment has insufficient brightness, the camera cannot find the correct focal length easily because the definitions of the images are generally low when the definitions are estimated. Thus, the passive auto focus has the problem of less accurate focusing when the environment is not bright enough.

SUMMARY OF THE INVENTION

In view of the above problems, the present invention provides a method for using a flash to assist in focal length detection, thereby solving the problems. The method for using the flash to assist in focal length detection disclosed in the present invention is applicable to a digital camera having a flash for providing a target focal length of the digital camera according to a target to be photographed. The method comprises: firing the flash, and capturing a first image; calculating at least one characteristic exposure value according to the first image; looking up a focus range comparison table according to the characteristic exposure value to acquire an initial focus position; and performing a focus procedure according to the initial focus position to obtain the target focal length.

The step of calculating at least one characteristic exposure value according to the first image may comprise: searching for a focusing frame having a focusing frame image in the first image; and calculating an exposure value of the focusing frame image as the characteristic exposure value.

The focus range comparison table comprises a plurality of exposure tabulated values and a plurality of focal length values corresponding to the exposure tabulated values. The step of looking up the focus range comparison table according to the characteristic exposure value to acquire the initial focus position comprises: looking up the focus range comparison table for the exposure tabulated value according to the characteristic exposure value, and using the focal length value corresponding to the characteristic exposure value as the initial focus position.

BRIEF DESCRIPTION OF THE DRAWINGS

The present invention will become more fully understood from the detailed description given herein below for illustration only, and thus are not limitative of the present invention, and wherein:

FIG. 3C is a schematic flow chart of a third embodiment of Step S22 according to an embodiment of the present invention;

DETAILED DESCRIPTION OF THE INVENTION

The detailed features and advantages of the present invention are described below, and the content of the detailed description is sufficient for those skilled in the art to understand the technical content of the present invention and to implement the present invention accordingly. Based upon the content disclosed in the specification, the claims, and the drawings, those skilled in the art can easily understand the relevant objectives and advantages of the present invention.

Figure 1:
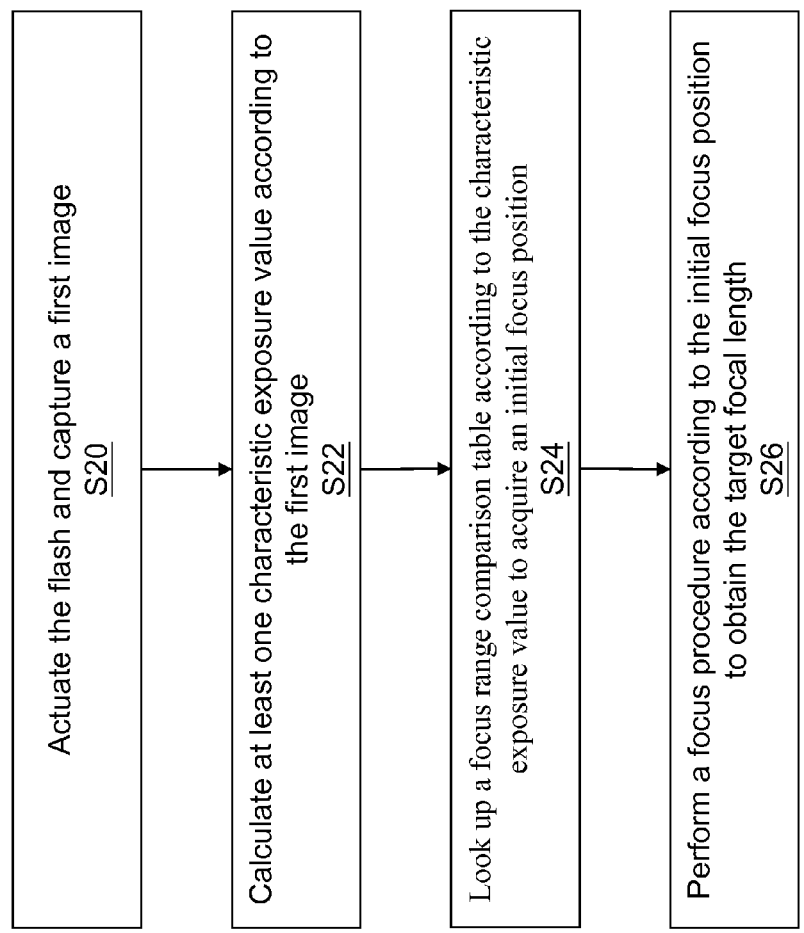
FIG. 1 is a flow chart of a method for using a flash to assist in focal length detection according to an embodiment of the present invention.

FIG. 1 is a flow chart of a method for using a flash to assist in focal length detection according to an embodiment of the present invention. The method for using the flash to assist in focal length detection in the present invention is adapted to a digital camera having the flash, and provides a target focal length of the digital camera according to a target to be photographed. The digital camera to which the present invention is applicable may be, but is not limited to, that shown in FIG. 2.

The digital camera 100 comprises the flash 102, a lens device 104, an aperture device 106, a photosensitive element 108, a sampling hold circuit 110, a storage unit 112, a drive motor 114, a processing unit 116, and an operating unit 118.

Light reflected by a scene enters the photosensitive element 108 via the lens device 104 and the aperture device 106, and the photosensitive element 108 converts the incoming light into an image signal, which is transmitted to the sampling hold circuit 110 and then recorded in the storage unit 112.

In the photographing, the processing unit 116 actuates the drive motor 114 to move the lens device 104 to a designated focal length position, and adjusts the aperture device 106. The photosensitive element 108 corresponding to the lens device 104 converts an image picture into an electrical signal of a digital image. Driven by the processing unit 116, the sampling hold circuit 110 transmits the image signal received by the photosensitive element 108 to the storage unit 112. The processing unit 116 determines a focusing focal length to enable the digital camera 100 to take a picture according to a preview image captured in the image capture and preview stage.

Figure 2:
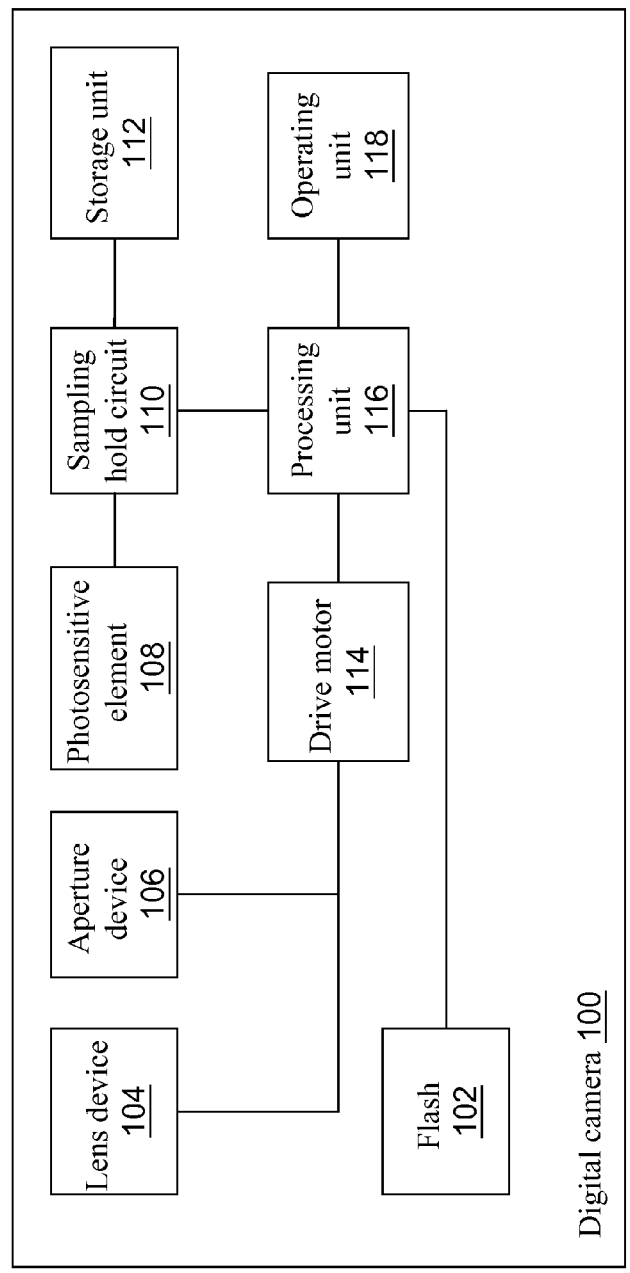
FIG. 2 is a schematic architectural view of a digital camera to which the present invention is applicable.

Referring to FIGS. 1 and 2, as can be seen from FIG. 1, the method for using the flash to assist in focal length detection comprises: Step S20: firing the flash and capturing a first image; Step S22: calculating at least one characteristic exposure value according to the first image; Step S24: looking up a focus range comparison table according to the characteristic exposure value to acquire an initial focus position; and Step S26: performing a focus procedure according to the initial focus position to obtain a target focal length.

In Step S20, the processing unit 116 actuates the flash 102 through the drive motor 114. When the flash 102 emits a pre-flash light, the digital camera 100 captures the first image and records it in the storage unit 112. The number of the captured image is not limited to only one, and for the sake of precision, a plurality of images may be used for processing in actual applications. Hereinafter, only a single image is used for illustration.

In Step S22, the first image represents a combination of ambient light reflected by the object to be photographed and the reflected light emitted by the flash 102, and thus the light forming the first image comprises the reflected pre-flash light. As a result, an exposure value here may also be referred to as a reflected exposure value. The characteristic exposure value denotes an exposure degree in a state where the object to be photographed is given the pre-flash light, which may vary for different distances between the object to be photographed and the digital camera 100. The calculation of the characteristic exposure value will be described in detail later.

After the characteristic exposure value is obtained, in Step S24, the focus range comparison table is looked up according to the characteristic exposure value. The focus range comparison table comprises a plurality of exposure tabulated values and focal length values corresponding to the exposure tabulated values. The focus range comparison table is a comparison table of characteristic exposure values and possible focal length values corresponding to the characteristic exposure values. The method for creating the focus range comparison table will be described in detail later.

In Step S26, the obtained initial focus position is used as a reference point of a focus scanning position of the focus procedure, so as to avoid the problem that all focus positions in the range from the minimum focus distance to infinity must be scanned in the focus procedure, thereby reducing the focusing time and power consumption required by the conventional focus procedure.

Figure 3A:
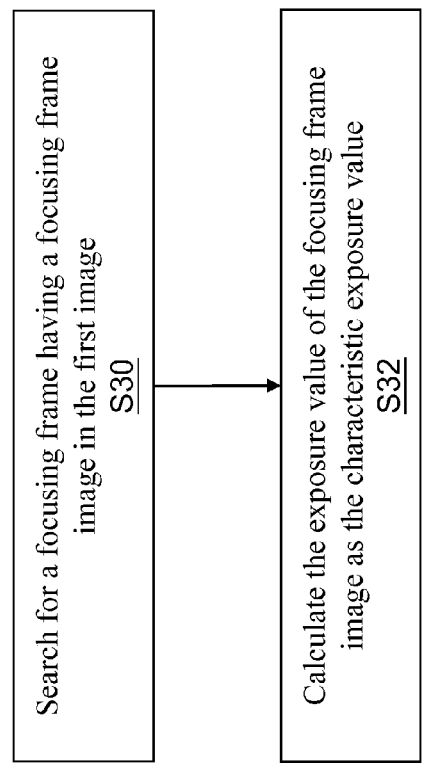
FIG. 3A is a schematic flow chart of a first embodiment of Step S22 according to an embodiment of the present invention.
Figure 3B:
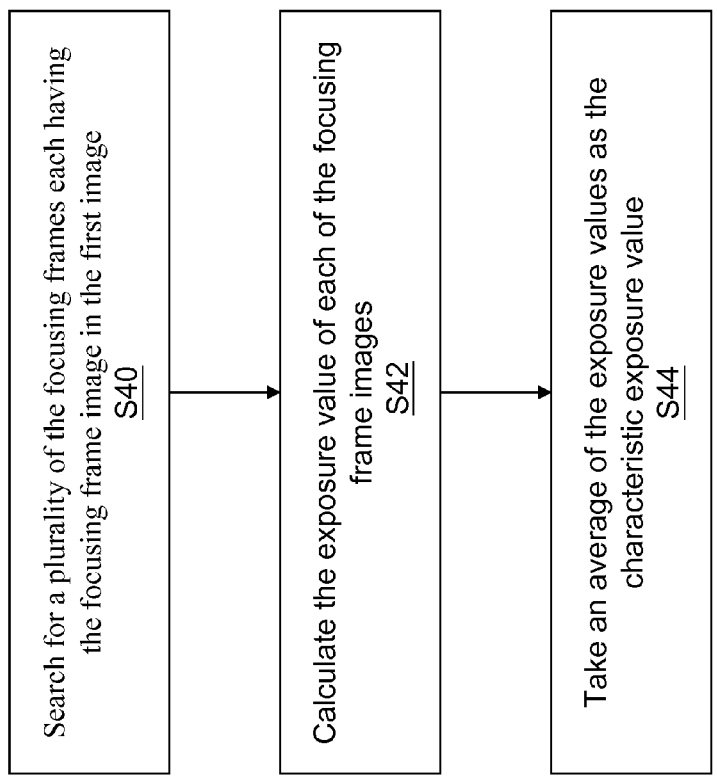
FIG. 3B is a schematic flow chart of a second embodiment of Step S22 according to an embodiment of the present invention.

The step of acquiring the characteristic exposure value from the first image is as shown in FIGS. 3A, 3B, and 3C. FIG. 3A is a schematic flow chart of a first embodiment of Step S22 according to an embodiment of the present invention. The process of this embodiment comprises: Step S30: searching for a focusing frame having a focusing frame image in the first image; and Step S32: calculating an exposure value of the focusing frame image as the characteristic exposure value.

In Step S30, after the focusing frame is searched out in the first image, the focusing frame image is captured. The focusing frame is used to mark the part of a main body to be photographed in an image when the image is captured. The shape of the focusing frame may be, but is not limited to, a square, and the size, number, and position thereof in the image are not limited either. The method for calculating the exposure value may be performed on each pixel in the focusing frame image. Each pixel has an RGB value. The method comprises: first converting the RGB value of each pixel into a gray scale value according to a formula (0.6G+0.3R+0.1B), calculating an exposure value of each pixel from the gray scale value according to a formula $\log_2(0.6G+0.3R+0.1B)$, and then taking an average of the exposure values of all the pixels as the characteristic exposure value of the focusing frame image.

FIG. 3B is a schematic flow chart of a second embodiment of Step S22 according to an embodiment of the present invention. The process of this embodiment comprises: Step S40: searching for a plurality of the focusing frames each having the focusing frame image in the first image; Step S42: calculating the exposure value of each of the focusing frame images; and Step S44: taking an average of the exposure values as the characteristic exposure value.

Figure 4A:
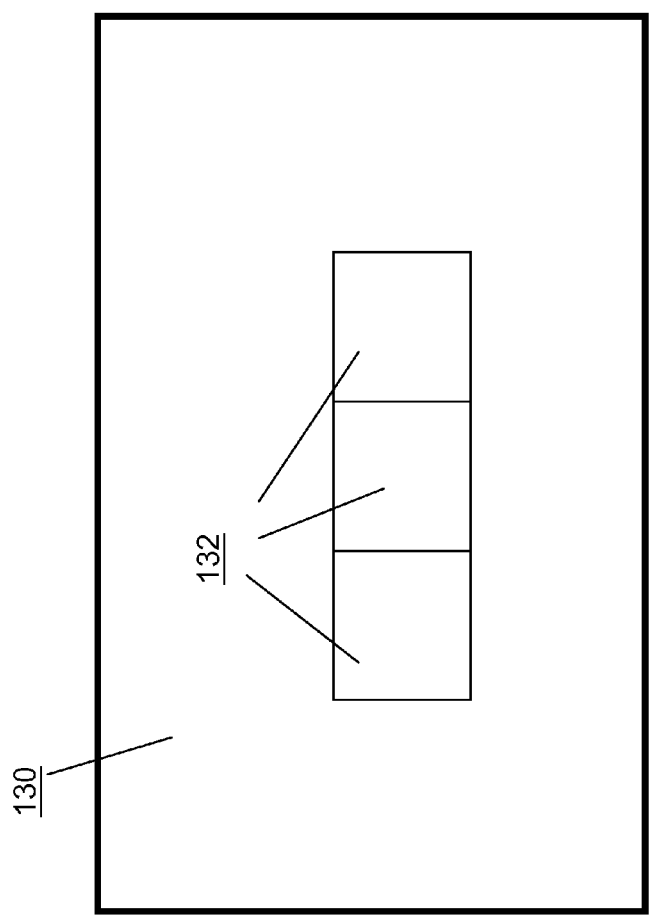
FIG. 4A is a schematic view of a focusing frame according to an embodiment of the present invention.
Figure 4B:
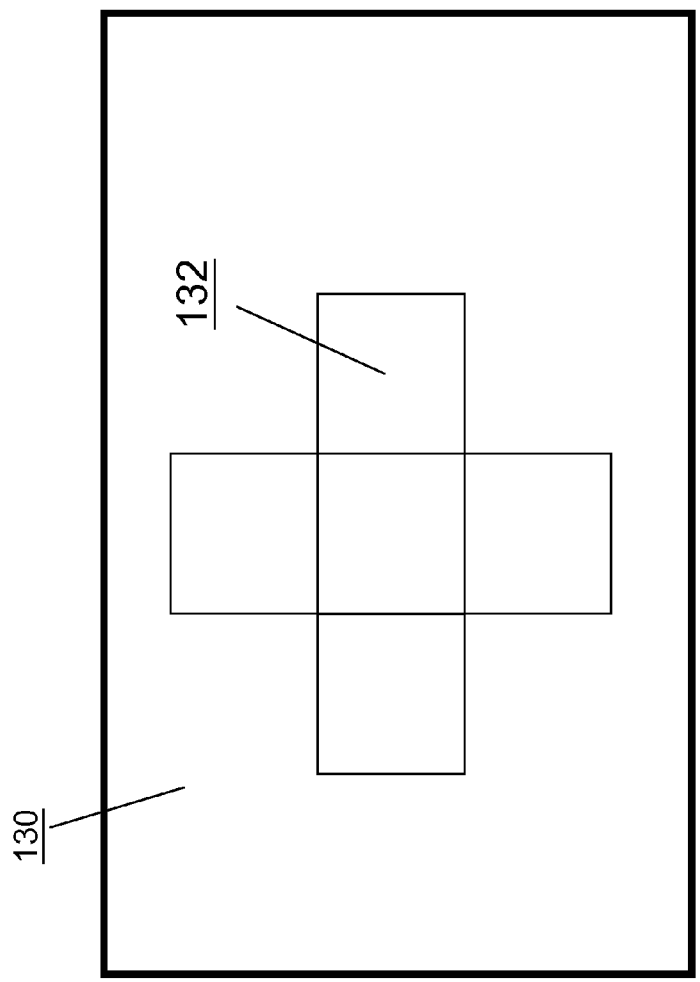
FIG. 4B is a schematic view of another focusing frame according to an embodiment of the present invention.

Referring to FIGS. 4A, 4B, 3B, and 3C, focusing frames built in different digital cameras 100 may take various forms. FIGS. 4A and 4B are schematic views of focusing frames according to different embodiments of the present invention. The focusing frames may be, but are not limited to, those shown in FIG. 4A or 4B. For example, the first image 130 may have three focusing frames 132 which form a shape of 1*3, or five focusing frames 132 which form a cross shape. In Step S40, after the plurality of focusing frames in the fist image is searched out, focusing frame images in the focusing frames are captured. In Step S42, the exposure values of the focusing frame images are respectively calculated according to the above formulas for calculating an exposure value.

In Step 44, an average of the plurality of exposure values calculated in Step S42 is taken as the characteristic exposure value, in which a general average calculation method or weighted averaging may be used. For example, a large weight is assigned to the exposure value of a focusing frame close to the center of a picture. In addition, the exposure value having the highest brightness may also be taken as the characteristic exposure value instead of the average.

FIG. 3C is a schematic flow chart of a third embodiment of Step S22 according to an embodiment of the present invention. The process of this embodiment comprises: Step S50: searching for the plurality of focusing frames each having the focusing frame image in the first image; Step S52: calculating the exposure value of each of the focusing frame images; and Step S54: using the exposure values as the characteristic exposure values. The number of the characteristic exposure values obtained in the third embodiment of Step S22 is not limited to one, but is multiple.

In the above method for calculating the exposure value of the focusing frame image, an average of pixels in a brighter portion, instead of all the pixels, in the focusing frame image may be taken as the exposure value of the focusing frame image. The brighter portion refers to pixels having higher exposure values after all the pixels are sorted according to the exposure values. For example, the exposure value of the focusing frame image may be calculated by taking the brightest 30% pixels of the focusing frame image, and then the characteristic exposure value is calculated accordingly. In this way, the influence caused by lots of environment images with insufficient brightness in the captured image is avoided.

After the characteristic exposure value is obtained, Step S24 is performed, in which the focus range comparison table is looked up according to the characteristic exposure value to acquire the initial focus position.

According to the embodiment of the present invention, the obtained characteristic exposure value may not have the exact corresponding exposure tabulated value in the focus range comparison table. At this time, two exposure tabulated values closest to the characteristic exposure value and corresponding focal length values thereof in the table are taken, and the initial focus position is calculated through an interpolation method.

Moreover, corresponding to the third embodiment of Step S22, the "looking up a focus range comparison table according to the characteristic exposure value to acquire an initial focus position" in Step S24 comprises looking up the focus range comparison table according to the characteristic exposure values respectively to obtain corresponding focal length values, and then comparing the focal length values and using the smallest focal length value as the initial focus position.

Figure 5:
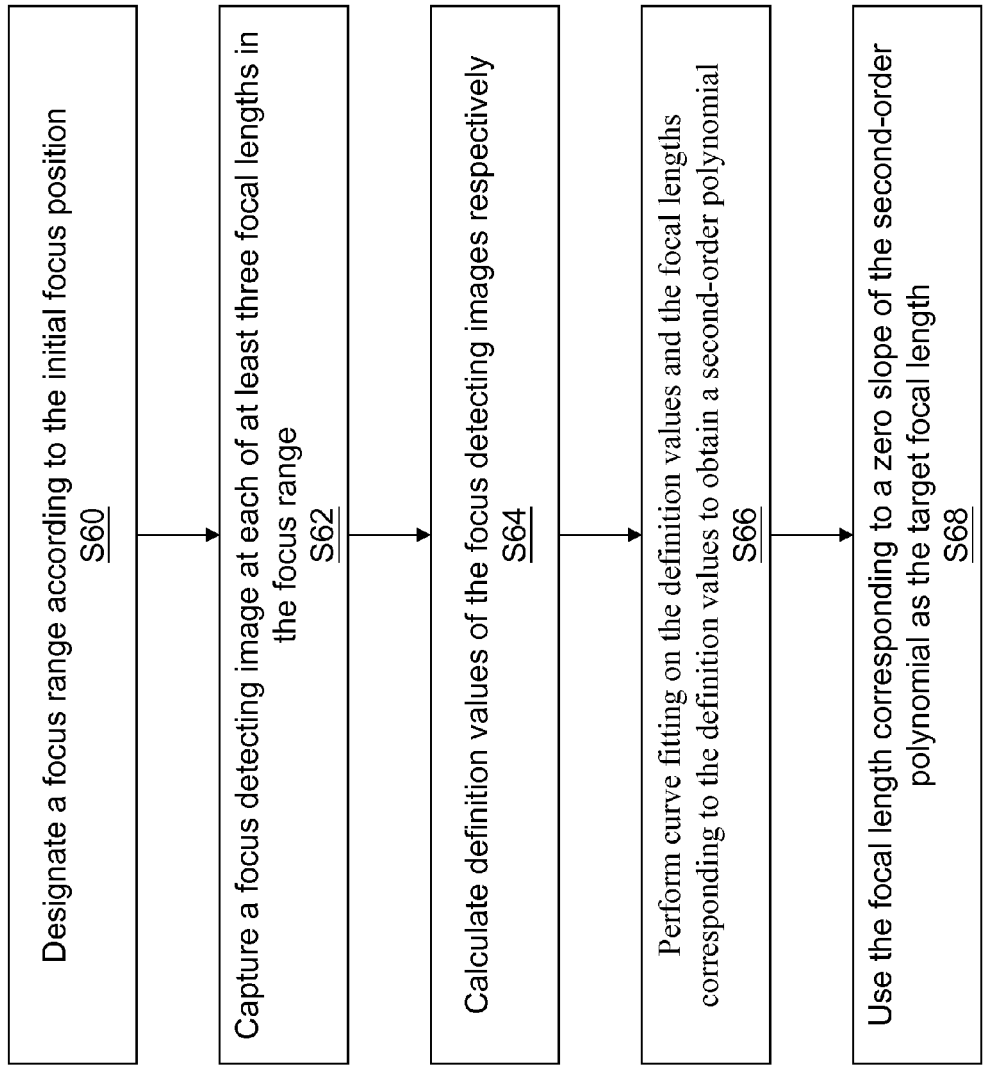
FIG. 5 is a schematic flow chart of Step S26 according to an embodiment of the present invention.

FIG. 5 is a schematic flow chart of Step S26 according to an embodiment of the present invention. As can be seen from FIG. 5, the process comprises: Step S60: designating a focus range according to the initial focus position; Step S62: capturing a focus detecting image at each of at least three focal lengths in the focus range; Step S64: calculating definition values of the focus detecting images respectively; Step S66: performing curve fitting on the definition values and the focal lengths corresponding to the definition values to obtain a second-order polynomial; and Step S68: using the focal length corresponding to a zero slope of the second-order polynomial as the target focal length.

In Step S60, the focus range is designated according to the initial focus position for the focus procedure to search for the target focal length in the range. The method for designating the focus range according to the initial focus position has several embodiments. One embodiment is to increase the initial focus position by three or more steps towards near focus and far focus positions, in which the steps may be or may not be consistent with each other. According to an embodiment of the present invention, the focus range may be determined according to a zooming factor in capturing the first image. For example, if the zooming factor of the digital camera is near the wide, the camera is possibly focused on a distant sight or at the long focal length when the first image is captured. Therefore, the range starting from three steps from the initial focus position near the digital camera up to six steps from the initial focus position far from the digital camera may be designated as the focus range.

Further, according to another embodiment of the present invention, if the zooming factor of the digital camera is near the tele (such that a distant scene image is drawn near the digital camera and a function of zooming in the image is achieved) when the first image is captured, a range starting from six steps from the initial focus position near the digital camera up to twelve steps from the initial focus position far from the digital camera is designated as the focus range.

In the method for designating the focus range according to the initial focus position, the unit is not limited to one step. The focus range may also be designated in a unit of a plurality of steps or a distance (for example, one centimeter or one millimeter). The ranges found with reference to the initial focus position in the directions close to and away from the initial focus position are not limited either. In addition to the above embodiments, the ranges found with reference to the initial focus position in the directions close to and away from the initial focus position may also be the same, or the range in the direction close to the initial focus position is larger.

In Step S62, the focus detecting image is captured at focal lengths respectively in the focus range designated in Step S60, in which the focus range comprises at least three focal lengths. In Step S64, definition values of the captured focus detecting images are calculated respectively. The method for calculating the definition value may comprise processing the focus detecting image by an edge-detection procedure. The edge-detection procedure may employ, for example, a Sobel algorithm, a Dijkstra's algorithm, or a Canny algorithm. After the processing by the edge-detection procedure, the definition value may be defined as the number of edges in the focus detecting image.

Figure 6A:
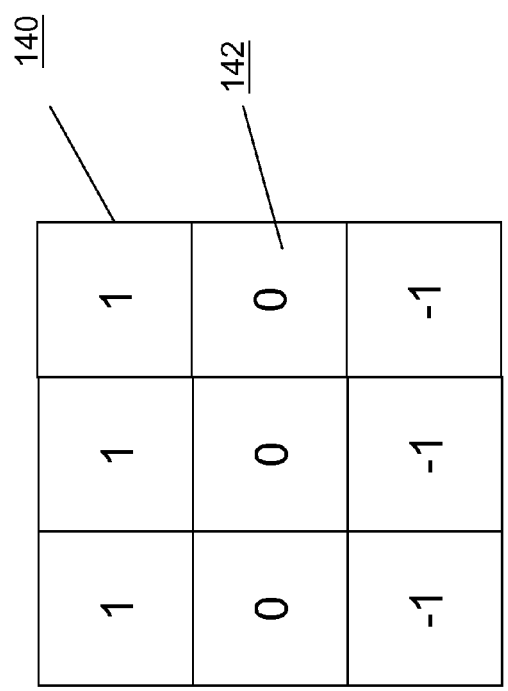
FIG. 6A is a schematic view of a horizontal mask according to an embodiment of the present invention.
Figure 6B:
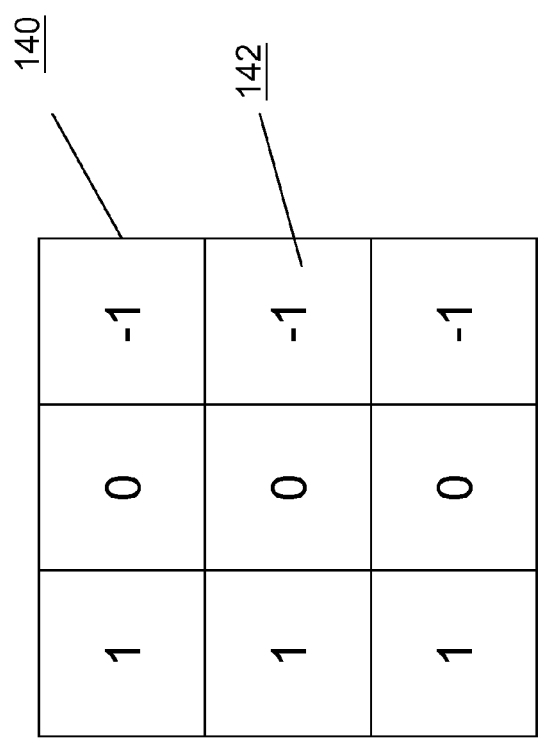
FIG. 6B is a schematic view of a vertical mask according to an embodiment of the present invention.

The edge-detection procedure according to the present invention applies a horizontal mask or vertical mask to each of the focus detecting images respectively. The content of the masks is as shown in FIGS. 6A and 6B, which are respectively schematic views of the horizontal mask and the vertical mask according to an embodiment of the present invention. As shown in the figures, the masks 140 comprise different mask content elements 142.

After the mask 140 is applied to the focus detecting image, each pixel of the focus detecting image acquires a contrast value, and the contrast values form a curve according to their magnitudes, such that each focus detecting image has a contrast curve. The procedure for calculating the definition value designates a threshold for the contrast curve. If the contrast value is higher than the threshold, it indicates that the contrast degree is high. Next, an integral is calculated on the portion of the contrast curve higher than the threshold, and then the calculated value is defined as the definition value.

Based on the definition values, in Step S66, a second-order polynomial curve fitting is performed on the definition values of the focus detecting images and the focal lengths corresponding to the definition values to obtain the second-order polynomial. A vertex of the second-order polynomial, i.e., a point with the zero slope, represents the maximum definition value that can be acquired in the focus range and the focal length at which the image having the highest definition can be obtained.

In order to obtain the vertex of the second-order polynomial, in Step S68, a differential is calculated for the second-order polynomial to search for a point with zero differential. In Step S68, the focal length corresponding to the point with the zero slope in the second-order polynomial is used as the target focal length. According to an embodiment of the present invention, when the point with the zero slope of the second-order polynomial obtained by the curve fitting does not exactly fall on any focal length designated in the focus range, the focal length nearest to the point with the zero slope is taken as the target focal length.

When the second-order polynomial obtained in the focus range does not have any point with zero slope, the focus range scanned by the focus procedure may be expanded to obtain more focus detecting images. The focus procedure performs the curve fitting again according to the original focus detecting images and the new focus detecting images, and searches for the point with the zero slope on the new second-order polynomial to obtain the target focal length.

After acquiring the target focal length through the method for using the flash to assist in focal length detection, the digital camera 100 drives the lens device 104 to move to the designated focal length position via the drive motor 114 and performs photographing.

The focus range comparison table may be created with an experimental method. In the experimental method, the flash fires in a dark room and various objects are photographed at different focal lengths, and characteristic exposure values corresponding to the focal lengths are calculated, thereby creating the focus range comparison table. The object to be photographed may be any object or a wall. The experiment may obtain multiple sets of characteristic exposure values based on surface characteristics (for example, easy to reflect light or easy to absorb light) of different objects to the photographed, so as to generate multiple sets of focus range comparison tables, and provide different modes for the selection of the user according to actual photographing conditions. Similarly, in the experiment, multiple sets of different photographing environmental conditions may also be simulated in the dark room to obtain multiple sets of corresponding focus range comparison tables, so as to provide different modes for the selection of the user according to actual photographing conditions.

What is claimed is:

1. A method for using a flash to assist in focal length detection, adapted to a digital camera having a flash, for providing a target focal length of the digital camera according to a target to be photographed, the method comprising:
    firing the flash, and capturing a first image;
    calculating at least one characteristic exposure value according to the first image;
    looking up a focus range comparison table according to the characteristic exposure value to acquire an initial focus position; and
    performing a focus procedure according to the initial focus position to obtain the target focal length.

2. The method for using the flash to assist in the focal length detection according to claim 1, wherein the step of calculating the at least one of the characteristic exposure value according to the first image comprises:
    searching for a focusing frame in the first image, wherein the focusing frame has a focusing frame image; and
    calculating an exposure value of the focusing frame image as the characteristic exposure value.

3. The method for using the flash to assist in the focal length detection according to claim 1, wherein the focus range comparison table comprises a plurality of exposure tabulated values and a plurality of focal length values corresponding to the exposure tabulated values, and the step of looking up the focus range comparison table according to the characteristic exposure value to acquire the initial focus position comprises looking up the focus range comparison table for the exposure tabulated value according to the characteristic exposure value, and acquiring the focal length value corresponding to the characteristic exposure value as the initial focus position.

4. The method for using the flash to assist in the focal length detection according to claim 1, wherein the step of calculating the at least one characteristic exposure value according to the first image comprises:
    searching for a plurality of the focusing frames in the first image, wherein each of the focusing frames has the focusing frame image;
    calculating the exposure value of each of the focusing frame images; and
    taking an average of the exposure values as the characteristic exposure value.

5. The method for using the flash to assist in the focal length detection according to claim 1, wherein the step of calculating the at least one of the characteristic exposure value according to the first image comprises:
    searching for a plurality of the focusing frames in the first image, wherein each of the focusing frames has the focusing frame image;
    calculating an exposure value of each of the focusing frame images; and
    using the exposure values as the characteristic exposure values.

6. The method for using the flash to assist in the focal length detection according to claim 5, wherein the step of looking up the focus range comparison table according to the characteristic exposure value to acquire the initial focus position comprises:
    looking up the focus range comparison table according to the exposure values respectively to obtain a plurality of focal length values; and
    using a minimum of the focal length values as the initial focus position.

7. The method for using the flash to assist in the focal length detection according to claim 1, wherein the step of performing the focus procedure according to the initial focus position to obtain the target focal length comprises:
    designating a focus range according to the initial focus position;
    capturing a focus detecting image at each of at least three focal lengths in the focus range;
    calculating a definition value of each of the focus detecting images;
    performing curve fitting on the definition values and the focal lengths corresponding to the definition values to obtain a second-order polynomial; and
    using the focal length corresponding to a zero slope of the second-order polynomial as the target focal length.

* * * * *